UNITED STATES PATENT OFFICE.

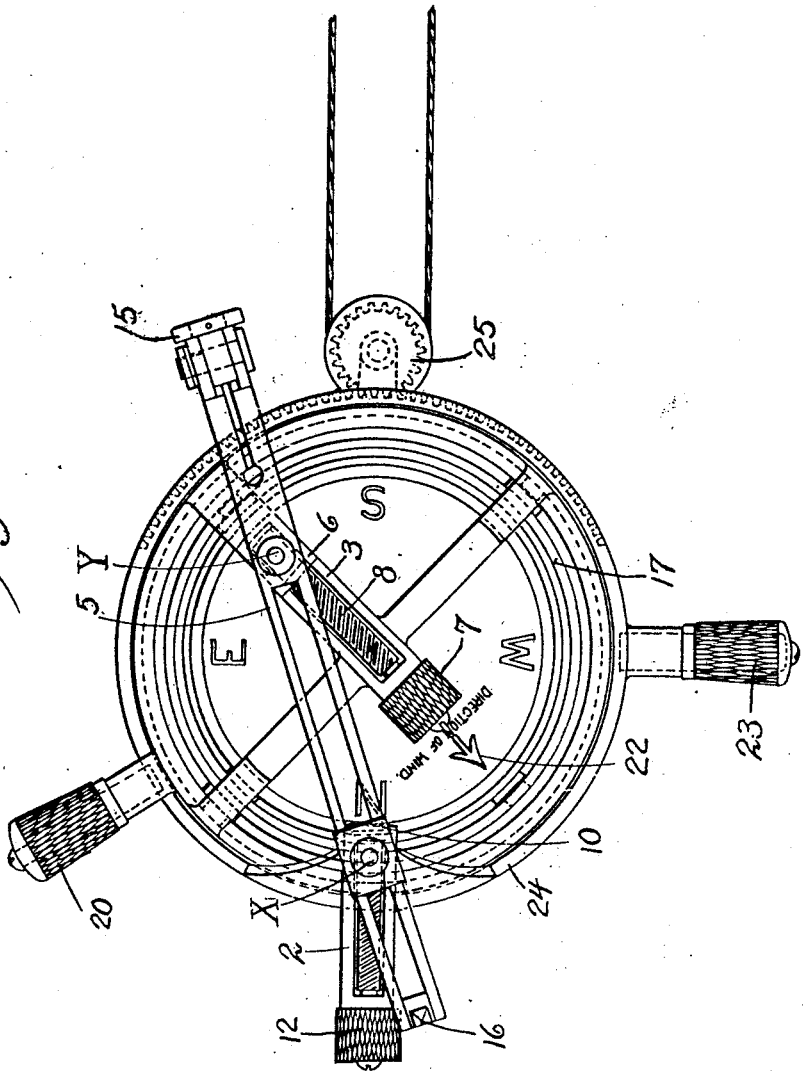

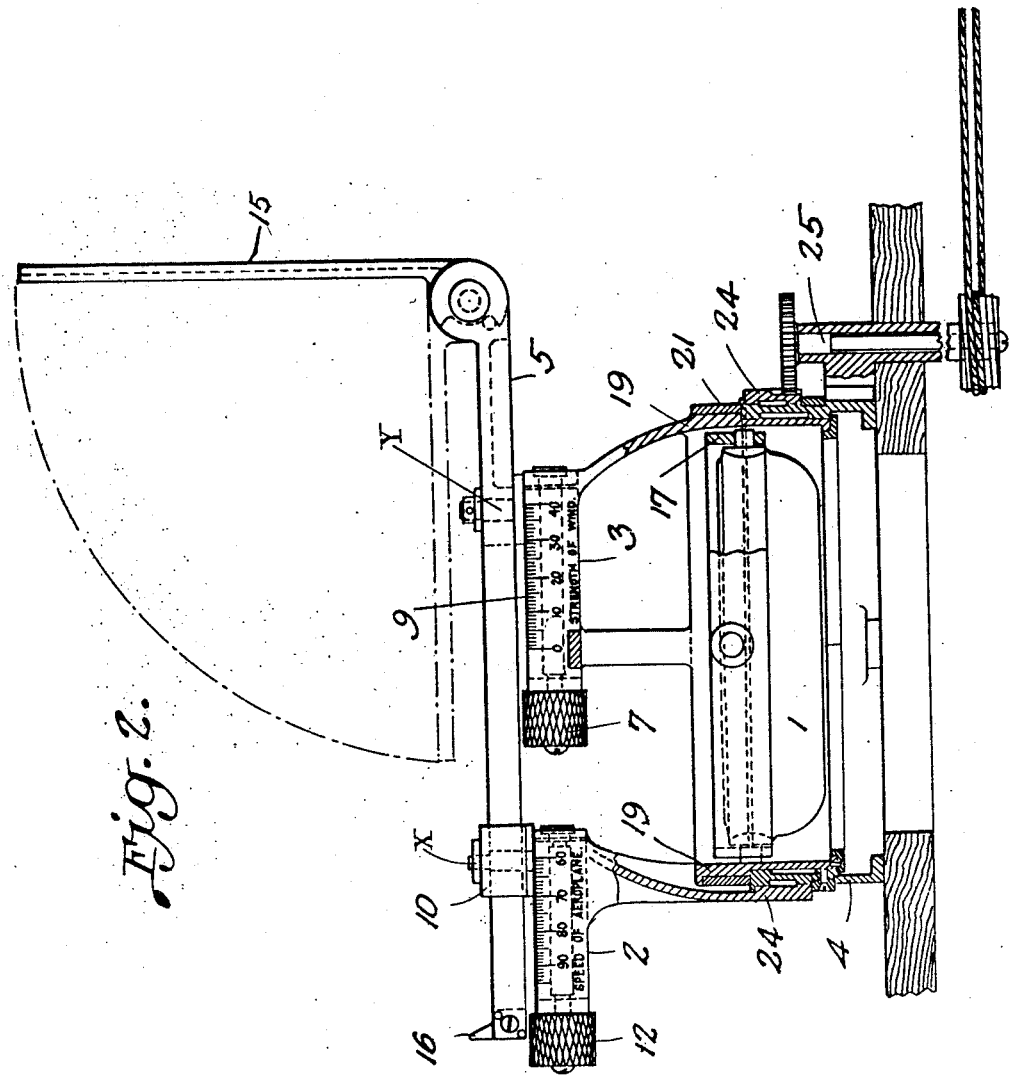

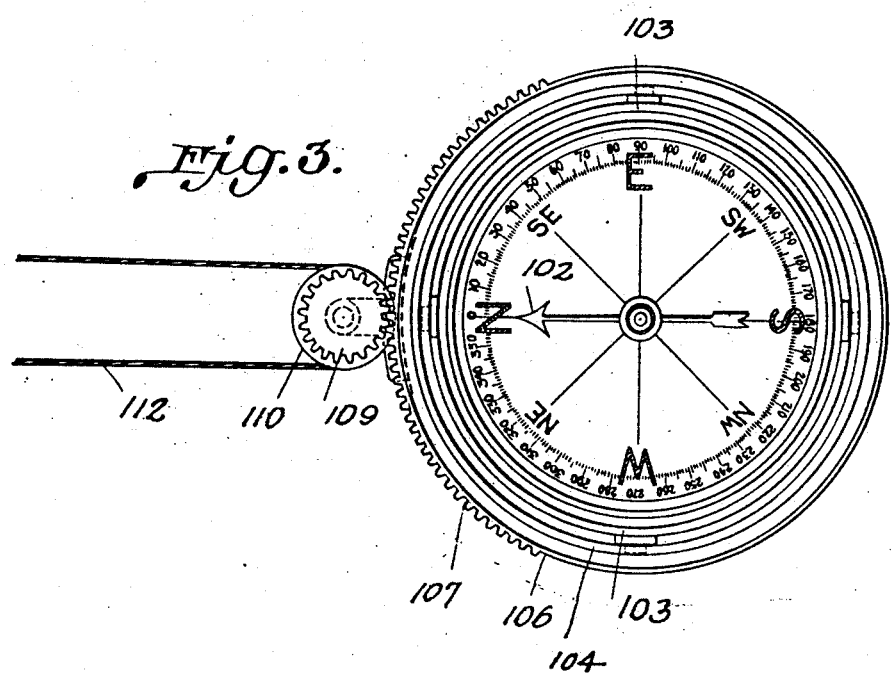
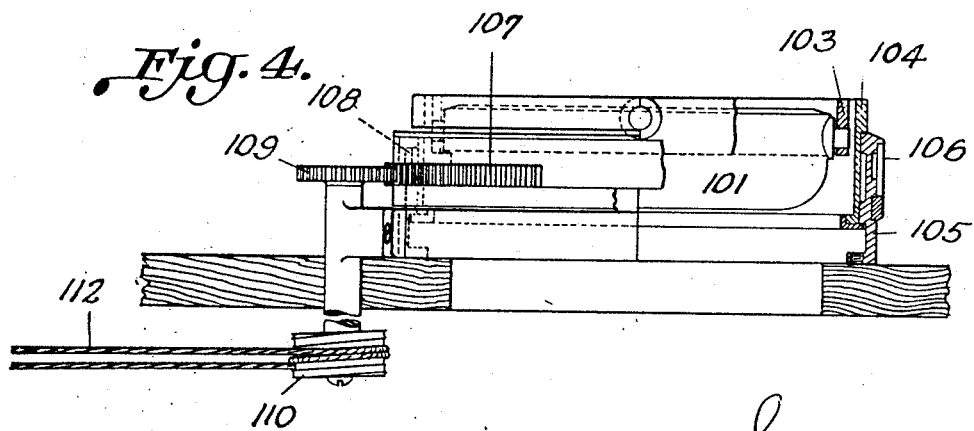

ARTHUR H. POLLEN, OF LONDON, AND HALVOR F. LANDSTAD, OF YORK, ENGLAND.

APPARATUS FOR DETERMINING AND CORRECTING THE COURSE OF AIRCRAFT.

1,314,429.     Specification of Letters Patent.     Patented Aug. 26, 1919.

Application filed April 3, 1919. Serial No. 287,330.

*To all whom it may concern:*

Be it known that we, ARTHUR HUNGERFORD POLLEN and HALVOR FOLKESTAD LANDSTAD, subjects of the King of Great Britain, residing at 14 Buckingham street, Strand, London W. C., and Bishophill House, York, Yorkshire, England, respectively, have invented certain new and useful Improvements in Apparatus for Determining and Correcting the Course of Aircraft, of which the following is a specification.

This invention relates to a linkage by means of which the course to be steered by the pilot of an aircraft so that he may pass over a given object on the ground is automatically indicated to him so long as an observer keeps a sight on the said object.

It is assumed that the observer knows the value of the following quantities; speed of the aircraft through the air, speed of wind and compass direction of wind.

The invention will be described with reference to the accompanying drawings of which Figure 1 represents a plan of the observer's instrument.

Fig. 2 represents a sectional elevation of the same.

Fig. 3 represents a plan of the pilot's instrument.

Fig. 4 represents an elevation of the same.

In front of the observer is mounted a compass.

The compass bowl 1 is pivoted in the gimbal ring 17 and the gimbal ring 17 is pivoted in a concentric ring 19, which is rotatably mounted in the frame 4 of the instrument.

A handle 20 is carried by a band brake 21 which grips the ring 19 when the handle 20 is rotated, thus enabling the observer to set the ring 19 rotationally.

The ring 19 carries an arm 3 above the face of the compass and so fixed that when the ring is rotated the arm rotates radially around the center of the compass. This arm is called the wind arm. A block 6 is provided which slides on the wind arm 3 and is adjustable by means of a knurled head 7 and screw 8 or its equivalent, lengthwise of the arm. The block carries a pivot Y.

The point on the wind arm vertically above the center of the compass is called the origin of the wind vector, the pivot Y is the terminus of the wind vector, and graduations 9 are provided so that by the aforesaid knurled head the known speed of the wind may be set up.

The aforesaid handle 20 enables the ring 19 carrying the wind vector arm 3 to be rotated so that it may coincide in direction with the known compass direction of the wind. Thus the vector representing the wind can be set up both as regards magnitude and direction.

Concentric with the compass is mounted another ring 24 carrying an arm 2 above the face of the compass likewise arranged to rotate radially around the center of the compass. This arm represents the speed through the air vector, and is arranged with its origin at the center of the compass and its terminal is against a block on which is mounted a pivot X.

Suitable knurled head 12 and handle 23 serve to set the magnitude and direction of the speed through the air vector just as has already been described for the wind vector.

Pivoted on the pivot Y at the terminus of the wind vector and sliding through a guide 10 pivoted at the terminus X of the speed through the air vector, is a sighting arm 5 which represents the speed overland vector. The distance between the pivots X and Y in fact represents the speed overland. We are however not concerned with the magnitude of this vector, but only with its direction.

The sighting bar has at its extreme rear end a vertical sight 15—the rear sight— which can be folded down along the sighting bar when not in use. At the extreme fore end it has a fore-sight 16.

The apparatus depends for its action on keeping the sighting arm 5 or speed overland vector sighted on the object. This determines the direction of the speed overland vector. The direction and magnitude of the wind vector are known and the magnitude of the speed through the air vector is also known.

These data give the direction of the speed through the air vector 2 which is the same in the angular position of ring 24. It therefore follows that when the initial settings already described have been made and the speed overland vector is kept sighted on the object, by altering the position of the terminal pivot of the speed through the air vector the direction of the speed through the air vector will indicate the direction in which the aircraft must be flown in order to pass over the object. The sight is therefore kept on the object, by keeping the compass direction of the wind vector correct all the time and altering the direction of the speed through the air vector so as to keep the sighting bar directed on the object.

It is now evident that the compass direction of the speed through the air vector is the direction in which the aircraft must be flown to pass the object.

This direction is transferred to an arm or lubber-mark capable of rotating around a similar compass situated in front of the pilot.

Any suitable transmission gear may be employed for copying the angular movement.

The transmission shown in the drawings consists of a spur wheel 25 meshing with teeth cut in ring 24 and carrying a drum over which passes the endless belt 112, which transmits corresponding motion to a drum 110, carrying a spur wheel 109 which meshes with teeth cut in a ring 106 (identical with ring 24) arranged to rotate concentrically around the pilot's compass 101.

Referring to Figs. 3 and 4 a compass 101 with an arrow 102 engraved on the glass cover is pivoted by its gimbal ring 103 to support a ring 104 which is rotatable inside a stationary frame 105. On the outside of this stationary frame 105 is fitted the aforesaid ring 106 supplied with a rack 107 which has the same pitch diameter as the rack on ring 24 on the observer's instrument previously described. This outside ring 106 is fixed to the inside ring 104 by a clamp 108. A suitable slot is arranged in the central stationary frame 105 to allow for this clamp 108 to connect the outside and inside rings 106 and 104 together.

With the above arrangement the arrow 102 on the pilot's compass will indicate the course which the pilot must steer in order that the aircraft may "drift" in the desired direction.

What we claim is:—

1. In combination with an aircraft, means thereon for determining the compass course to be steered with reference to a given object, said means including a movable member adapted to be adjusted according to the known constant "speed through the air", a second movable member adapted to be adjusted according to the known constants "speed of wind" and "compass direction of wind", a sighting device pivotally and slidably connected with said members and movable to sight on the object, and means controlled by the movements of the sighting device for indicating said compass course.

2. In combination with an aircraft, a compass thereon, an arm rotatable about an axis coincident with the center of the compass to indicate the compass direction of the wind, movable means on said arm for setting up the "speed of the wind" constant, a second arm rotatable about said axis, movable means on said second arm for setting up the "speed through the air" constant, and a sighting bar pivotally connected with said movable means respectively, said sighting bar being shiftable to sight on a given object in reference to which the aircraft is to be steered.

3. In combination with an aircraft, a compass thereon, an arm rotatable about an axis coincident with the center of the compass to indicate the compass direction of the wind, movable means on said arm for setting up the "speed of the wind" constant, a second arm rotatable about said axis, movable means on the second arm for setting up the "speed through the air" constant, and a sighting bar pivoted to the movable means on the wind direction arm and having a pivotal and sliding connection with the movable means on the other arm, said sighting bar being shiftable in sighting on a given object in reference to which the aircraft is to be steered.

4. In combination with an aircraft, a compass thereon, a member rotatable about an axis coincident with the center of the compass, movable means on said member for setting up the "speed through the air" constant, a second member rotatable about said axis to indicate the compass direction of the wind, movable means on said second member for settting up the "speed of wind" constant, a sighting bar pivoted to said movable means respectively, and adapted to be shifted by the rotating movement of the first mentioned member in sighting on a given object to determine the course to be steered with reference to said object, and a movable device for indicating to the pilot the determined course, said device being operatively connected with the first mentioned rotatable member to be operated thereby in shifting the sighting device.

5. In combination with an aircraft, a compass thereon, an arm extending radially of the center of the compass and rotatable about an axis coincident with said center, to indicate the compass direction of the wind, a slide carried by said arm, means for adjusting the slide longitudinally thereof to set up the "speed of wind" constant, a second arm extending radially of the center of the compass and rotatable relatively to the first mentioned arm about an axis coincident with the center of the compass, a slide carried by said second arm, means for adjusting the slide longitudinally of the arm to set up the "speed through the air" constant, and a sighting bar pivotally connected to said slides respectively, and adapted to be shifted in the rotative movements of the arms in sighting on a given object to determine the course to be steered with reference to the same.

6. In combination with an aircraft, a movable member thereon adapted to be adjusted in accordance with the known constant "speed through the air", a second movable member adapted to be adjusted in accordance with the known constants "speed of wind" and "compass direction of wind", said members being movable relatively to each other, a sighting bar pivotally and slidably connected with said members and shiftable to be sighted on an object, whereby the compass course to be steered with reference to said object is determined, and means controlled by the movements of said sighting bar for automatically indicating the said compass course to the pilot.

In testimony whereof we have hereunto set our hands in presence of two subscribing witnesses.

ARTHUR H. POLLEN.
HALVOR F. LANDSTAD.

Witnesses:
NEVILLE E. BROOKER,
E. C. WALKER.

Copies of this patent may be obtained for five cents each, by addressing the "Commissioner of Patents, Washington, D. C."